May 14, 1957 D. E. RUTTER 2,792,174

BINARY CODE CONVERTER

Filed Dec. 21, 1953 3 Sheets-Sheet 1

INVENTOR.
DONALD E. RUTTER
BY
Kenyon & Kenyon
ATTORNEYS

INVENTOR.
DONALD E. RUTTER
BY
Kenyon & Kenyon
ATTORNEYS

May 14, 1957 D. E. RUTTER 2,792,174

BINARY CODE CONVERTER

Filed Dec. 21, 1953 3 Sheets-Sheet 3

INVENTOR.
DONALD E. RUTTER

BY

Kenyon & Kenyon
ATTORNEYS 2,792,174

BINARY CODE CONVERTER

Donald E. Rutter, Vestal, N. Y., assignor to International Business Machines Corporation, New York, N. Y., a corporation of New York Application December 21, 1953, Serial No. 399,417

11 Claims. (Cl. 235—61)

This invention relates to an apparatus for converting binary code input pulses into a decimal, alphabetical or other indicative output pulse.

The principal object of this invention is to provide a structurally and operationally simple means for converting binary code input pulses to output pulses designating corresponding decimal, alphabetical or other indicative designations.

A further object of this invention is to provide a mechanism that will convert a binary input to a decimal, alphabetical or other indicative output that can be compacted into a very small container.

The invention itself together with further objects and the many advantages thereof will best be understood by reference to the following specification describing an embodiment thereof which will be better understood with the aid of the accompanying drawings in which.

Figure 1:
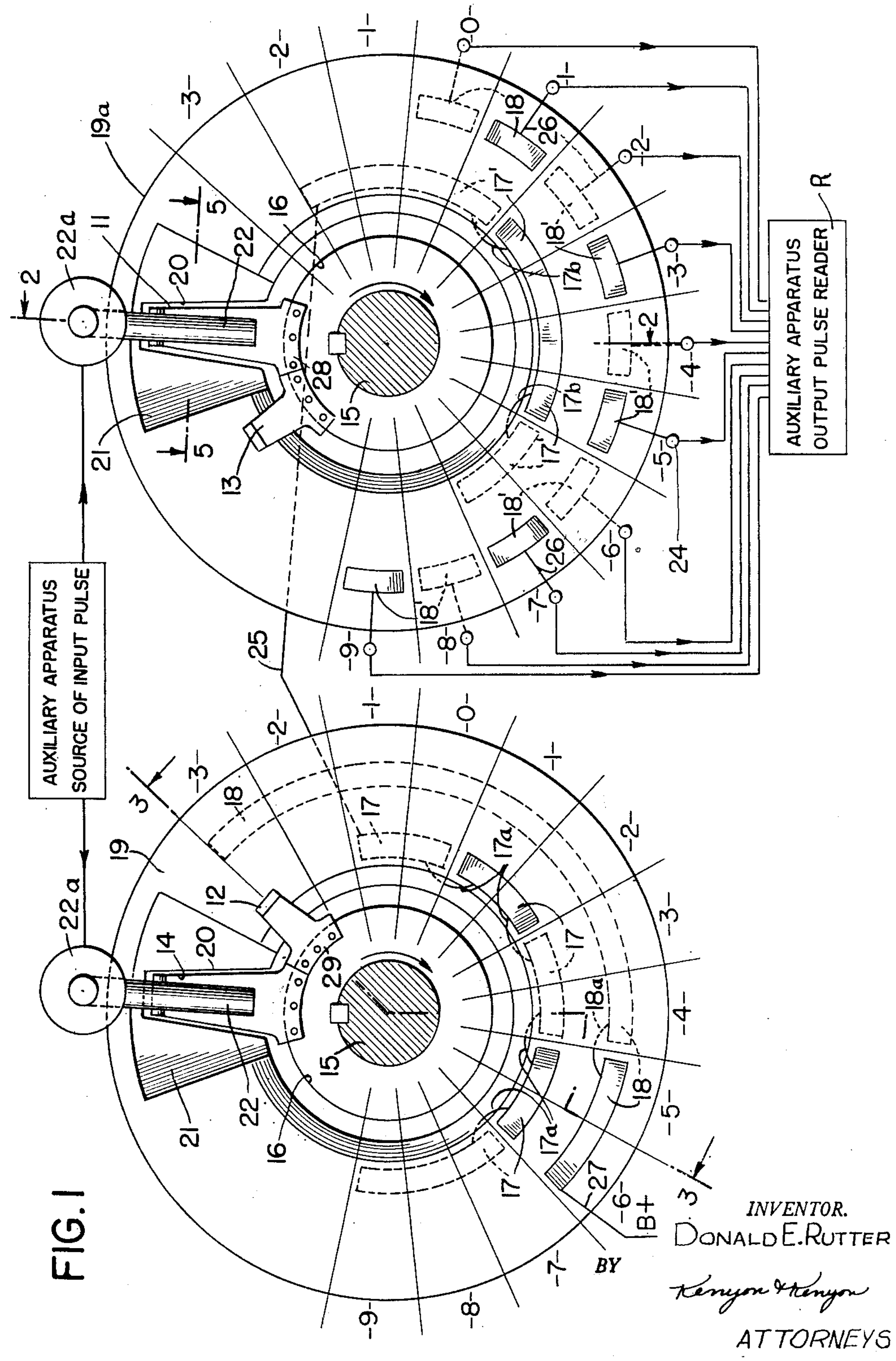
Figure 1 is a partial schematic and partial plan view of the apparatus of my invention.
Figures 2, 3, 4, 5:
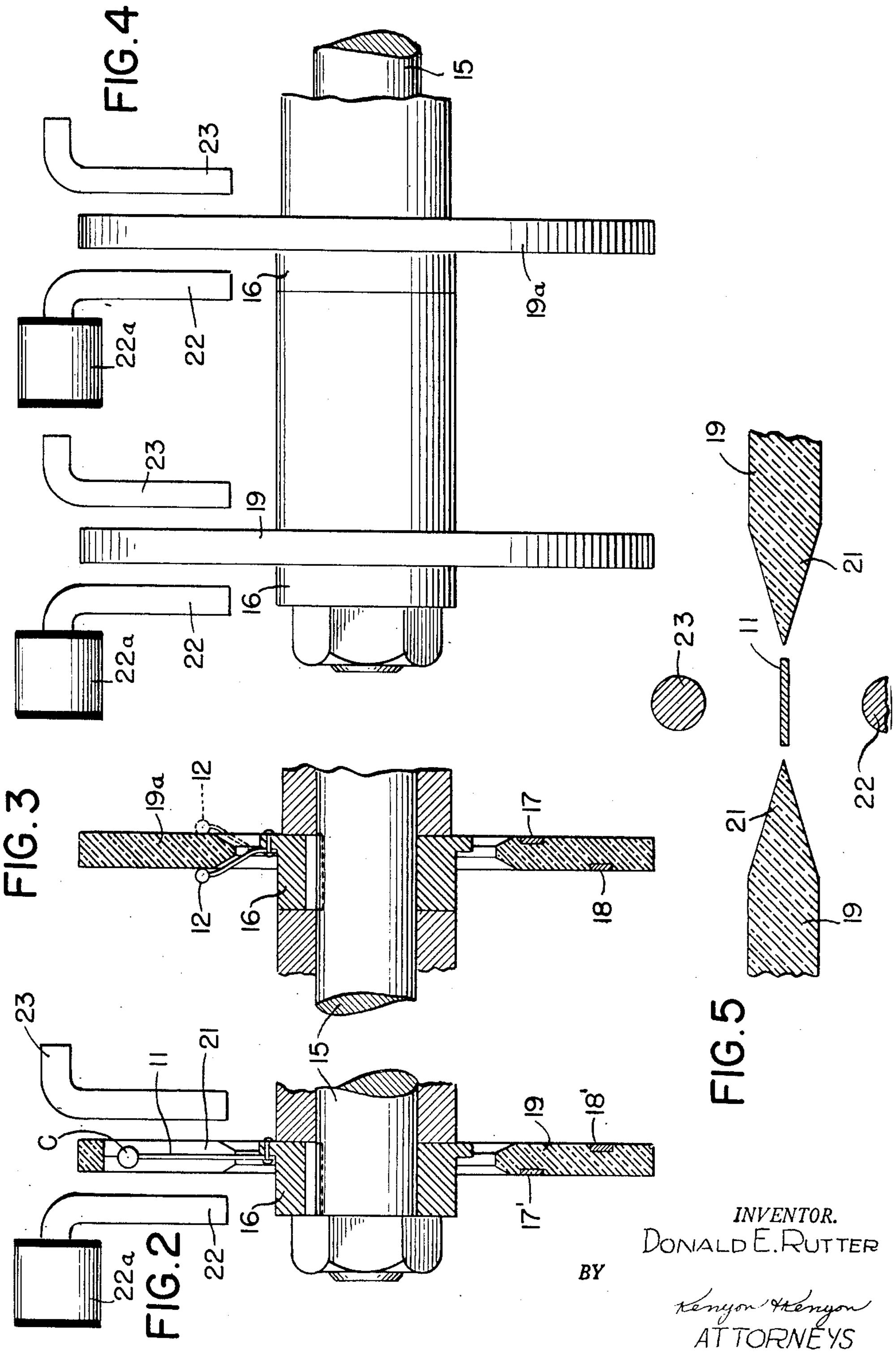
Figure 2 is a sectional view on line 2—2 in Figure 1.
Figure 3 is a sectional view on line 3—3 in Figure 1.
Figure 4 is an elevational view of the apparatus of my invention.
Figure 5 is a sectional view on line 5—5 in Figure 1.

Referring to Figure 1 the two sets of stators 19, 19*a* and rotors 16 shown side by side are in fact positioned in planes parallel to each other as shown in Figure 4, with a common shaft 15 extending through the centers of the rotors 16 and attached thereto. The shaft 15 is supported by an ordinary means such as a bearing and is continuously rotated by any rotating means.

The operational objective of this apparatus is to convert a specific group of binary input pulses into a related output pulse which pulse will indicate to the auxiliary apparatus that it is read into what the said group of input pulses designate. This objective is accomplished by controlling by means of the input pulses the positions in relation to a plurality of contacts of a plurality of electrically conducting brushes in a manner such that a given group of input pulses will so position these brushes in respect to the contacts that a definite and indicative output pulse will result.

In the embodiment of this apparatus shown in the attached drawings this objective is accomplished by positioning the brushes in respect to the contacts (as will be hereinafter fully described) so that a circuit is completed between the source of power B+ and only one of ten hubs 24 corresponding to decimal units -0- through -9-. In this embodiment shown all these brushes will be positioned with respect to the contacts to be brushed at one point in each revolution and only one completed circuit from the source of power B+ to a hub 24 will be completed in each of said revolutions as will be explained hereinafter.

In the embodiment of my invention shown the electrically conductive brushes or contacts 11, 12, 13 and 14, which may be in the form of flexible magnetic fingers or reeds, are fixedly attached to the rotors 16 and extend radially away from the outer periphery of said rotors. The brushes 11 and 13 attached to a common rotor 16 are conductively connected to each other by means of the conductor 28 extending between them. The brushes 12 and 14 attached to a rotor 16 are similarly connected to each other by means of conductor 29. The rotors 16 are formed of an electrically non-conductive material. The said flexible brushes are disposed on their respective rotors in spaced angular relation to one another so that as the rotors revolve they pass any fixed angular position in their sweep in the order of 11 first, 12 second, 13 third and 14 fourth.

The electrically non-conductive stators 19, 19*a* rigidly positioned adjacent the outer circumferences of the rotors 16 by any common supporting means, abut the free ends of the said brushes during their 360 degree revolutions. Each of the said stators has two sides facing in opposite directions, a normal or back side, and a setup or front side, the setup sides being toward the observer in Figure 1. A series of contacts 17, 17′, 18 and 18′ in the shape of sectors of rings extend in two concentric arcs over a sector of each of said stators. The contacts 17, 17′, 18 and 18′ shown in solid lines are affixed to the face of the setup side of said stators and the contacts shown in dotted lines are affixed to the face of the normal side of said stators. All contacts 17 are conductively interconnected by the loops 17*a*; all contacts 17′ are conductively interconnected by the loops 17*b*; all contacts 18 are conductively interconnected by the loops 18*a*. One of the end contacts 17 is electrically connected, as shown, to an end contact 17′ by a conductor 25. The contacts 18 on the setup side of the stator 19 are electrically connected to the source B+ by conductor 27. A conductor 26 connects each of the contacts 18′ with one of the hubs 24. Each of the hubs 24 may be connected by a conductor, as shown, to an output pulse reader R, as shown. There are ten contact segments 18′ of substantially equal length, the contacts 18′ being connected successively to the hubs 24. The length, number and location of the rings of contacts 17, 17′ and 18 are such as to complete the circuit between the source B+ and the desired hub 24 for each binary code combination corresponding to a decimal unit. As shown, there are five contacts 17 of substantially equal length arranged alternately on opposite faces of stator member 19. There are three contacts 17′, the middle one being on the setup side of the stator 19*a*, the other two on the normal side thereof. As shown, one of the contacts 17′ on the normal side of the stator is relatively short compared with the other two, which are of substantially equal length. There are two contacts 18 arranged on opposite faces of the stator 19, the one on the setup side being relatively short compared with the other.

The longer brushes 11 and 14 ride over the surfaces of the outer contacts 18 and 18′ during their respective revolutions and the shorter brushes 12 and 13 ride over the surfaces of the inner rings of contacts 17 and 17′ during their respective revolutions. The longer brushes 11 and 14 are provided with a spherical contact C at the outer ends so that they do not contact the surfaces of the inner contacts 17 and 17′ during that portion of their respective sweeps where they sweep over these contacts regardless of the side of the stator they are positioned on.

Through each stator 19, 19*a* there is an aperture 20 with inclined surfaces 21 (Fig. 5) extending circumferentially away from the aperture on both sides and both on the normal and setup sides of the said stator. Located on the setup side of each stator and in a plane parallel thereto is an electromagnet 22 juxtapositioned to extend over the aperture 20. A permanent magnet 23 is positioned in a similar position on the normal side of each of said apertures. These positions of the magnets in relation to the stator may be seen in Figure 2.

Each brush 11, 12, 13 and 14 passes an aperture 20, in its respective stator 19, during each 360 degree revolution of the rotor 16. If the electromagnet 22 positioned adjacent an aperture 20 is energized during the passage of a brush thereby, that brush will be pulled to the setup side of its stator 19 and in passing beyond the aperture in its clockwise traverse will ride up an inclined plane 21 onto the said stator to ride on the face of the setup side during one complete revolution, that is until it again reaches the said aperture. Likewise if the said electromagnet positioned adjacent an aperture is not energized during the passage of a brush thereby, the permanent magnet 23 positioned on the normal side will pull the brush to the normal side of the stator and the brush will ride on the face of the normal side during one 360 degree revolution.

Each electromagnet 22 is energized by electrical pulses read into its energizing coil 22*a* from an auxiliary apparatus, for example a binary code card reader shown schematically in Figure 1. This code card reader must be operated in timed relation to the movement of the brushes as will now be described. As the brush 11, corresponding to the binary code number –1–, passes the aperture 20 in its stator 19 the code card reader must be positioned at –1– time. If at –1– time the code card reader senses a binary –1– perforation in the card being read then an electrical pulse will be read out of the card reader and into the converter and will energize the electromagnet 22 positioned on the setup side of the said stator aperture at the instant the brush 11 passes by the said aperture in its sweep. The brush 11 will thus be drawn to the setup side of its stator and will ride thereon during that 360 degree revolution. It will be seen that if the auxiliary code card reader does not sense a binary –1– perforation in the card being read the electromagnet 22 will not be energized at the time the brush 11 passes by the said aperture and thus the permanent magnet 23 will pull the said brush to the normal side and the brush will ride thereon during one revolution.

It should be further understood that at binary code times –2–, –4– and –8– the energizing of the respective electromagnets and thus, the positioning of the respective brushes will be controlled by the code card reader sensing or not sensing a binary perforation in the card being read at the respective binary times.

The conversion of a binary code input to a numerical output will now be described. The binary code input will control the electromagnets 22 to position the brushes 11, 12, 13 and 14 on the stator in a manner such that the circuit from B+ will be completed only to a single hub 24 during each 360 degree revolution of the brushes. During a single revolution of the rotor 16, with the brushes attached thereto, the binary code input pulses will position the brushes on one side or the other of the stator 19. Once positioned on a side of the stator, during an interval of their respective 360 degree revolutions, the brushes will remain on their respective sides until they again reach the same positioning point. During their traverse during each 360 degree revolution the brushes will at a definite angle in this traverse complete a circuit between the source of power B+ and a single hub 24. Likewise at all other angles during a single 360 degree revolution the brushes will not complete a circuit between the source of power B+ and any hub 24. Thus during each 360 degree revolution of the rotor the brushes are positioned and complete a circuit to read out a single pulse indicative of the brushes positioning and on the succeeding revolutions the brushes are similarly positioned and similarly read out a single output pulse and on ad infinitum.

An example of the operation of the apparatus during a single 360 degree revolution in converting the binary code for decimal digit –7–, that is binary code input components –1–, –2– and –4–, to a B+ pulse at hub 24, designated by digit –7–, will be described. As the brush 11, binary –1–, passes by the aperture 20 in its stator 19 the electromagnet 22 adjacent thereto is energized pulling brush 11 to the setup side of its stator. As the brush 12, binary –2–, passes by the aperture 20 in its stator 19 the electromagnet 22 adjacent thereto is energized pulling brush 12 to the setup side of its stator. As the brush 13, binary –4–, passes by the aperture 20 in its stator 19 the electromagnet 22 adjacent thereto is energized pulling brush 13 to the setup side of its stator. As the brush 14, binary –8–, passes by the aperture 20 in its stator 19 the electromagnet 22 adjacent thereto is not energized so that the brush 14 is pulled to the normal side of its stator by the permanent magnet 23 adjacent to the said aperture.

As these brushes continue their sweeps around their respective stators 19 no completed circuit will be made between B+ and any of the hubs 24 until the brush 11 touches the contact designated by digit –7– in the arc of contacts 18′. The angular spacing of the brushes is the same as the angular spacing of the decimal positions and at the time that the brush 11 touches the contact designated by the said digit –7– the brushes will be in the following positions. Brush 11 will ride on the outer arc of contacts 18′ on the setup side at position designated by digit –7–. Brush 12 will ride on the inner arc of contacts 17 on the setup side at position designated by digit –6–. Brush 13 will ride on the inner ring of contacts 17′ on the setup side at position designated by digit –5–. Brush 14 will ride on the outer ring of contacts 18 on the normal side at position designated by digit –4–. It will be noted that the first three of these brushes, corresponding to binary components –1–, –2– and –4–, were each pulled to the setup side and further that the positions that these three brushes ride on when brush 11 (binary –1–) is at position designated by digit –7– are all plain contacts, meaning contacts on the setup sides of the stators. Also note the fourth brush corresponding to binary –8– was pulled to the normal side and that the position that this brush rides on when brush 11 (binary –1–) is at position designated –7– is a dotted contact, meaning a contact on the normal side of the stator.

Thus the completed circuit from B+ to the hub 24 designated –7– is from B+ through the conductor 27 to the outer ring of contacts 18 to brush 14 located at position designated –4– on the normal side, through the 14 and 12 brush interconnector 29 to brush 12 located at position designated –6– on the setup side of the ring of contacts 17, through the conductor 25 to ring of contacts 17′, to brush 13 located at position designated –5– on the setup side of the ring of contacts 17′, through the 13 and 11 brush interconnector 28 to brush 11 located at position designated –7– on the setup side of the ring of contacts 18′, through the conductor 26 to the hub 24 designated –7–.

When the brushes are positioned on the above described respective sides of the stators (and in fixed spaced angular relation) to read out a pulse at the hub 24 designated –7–, this will be the only output pulse during that 360 degree revolution of the brushes. This is true because as the brushes in these positions pass over the contacts it is essential that each of the brushes make contact with a contact to complete a circuit from the source of power B+ to a hub 24. This contacting of a contact by all four brushes takes place only at the time when the brush 11 contacts the contact 18 connected to hub 24 designated –7– and at all other times during the traverse of the brushes across the contacts one or more of the brushes will not make contact. Thus by reading the binary code components –1–, –2–, and –4– into the apparatus comprising my invention a conversion is accomplished resulting in the reading out of a pulse at and only at an indicative decimal –7– position.

It may be readily ascertained that any other combination of binary code components read into my apparatus will result in the completion of the circuit from B+ to a hub 24 designating a corresponding decimal position. That is if any one of the binary code combinations in the lefthand column of the table below is read into my apparatus there will be a resultant pulse out at the corresponding decimal position in the righthand column of the table:

| Read-in | Read-out |
|---|---|
| — | -0- |
| -1- | -1- |
| -2- | -2- |
| -1-2- | -3- |
| -4- | -4- |
| -1-4- | -5- |
| -2-4- | -6- |
| -1-2-4- | -7- |
| -8- | -8- |
| -1-8- | -9- |

It should be noted that the brush or brushes corresponding to the "Read-in" column above will be pulled to the setup sides of their respective stators in each instance whereas the remaining brush or brushes will similarly be pulled to the normal sides of their respective stators. Once the brushes are positioned for each of the respective binary code combinations read into the apparatus of my invention only one completed circuit will be made from the source of power B+ to a hub 24 which hub will correspond to the read-in combination and will be the hub opposite the said combination in the above table.

Figure 6:
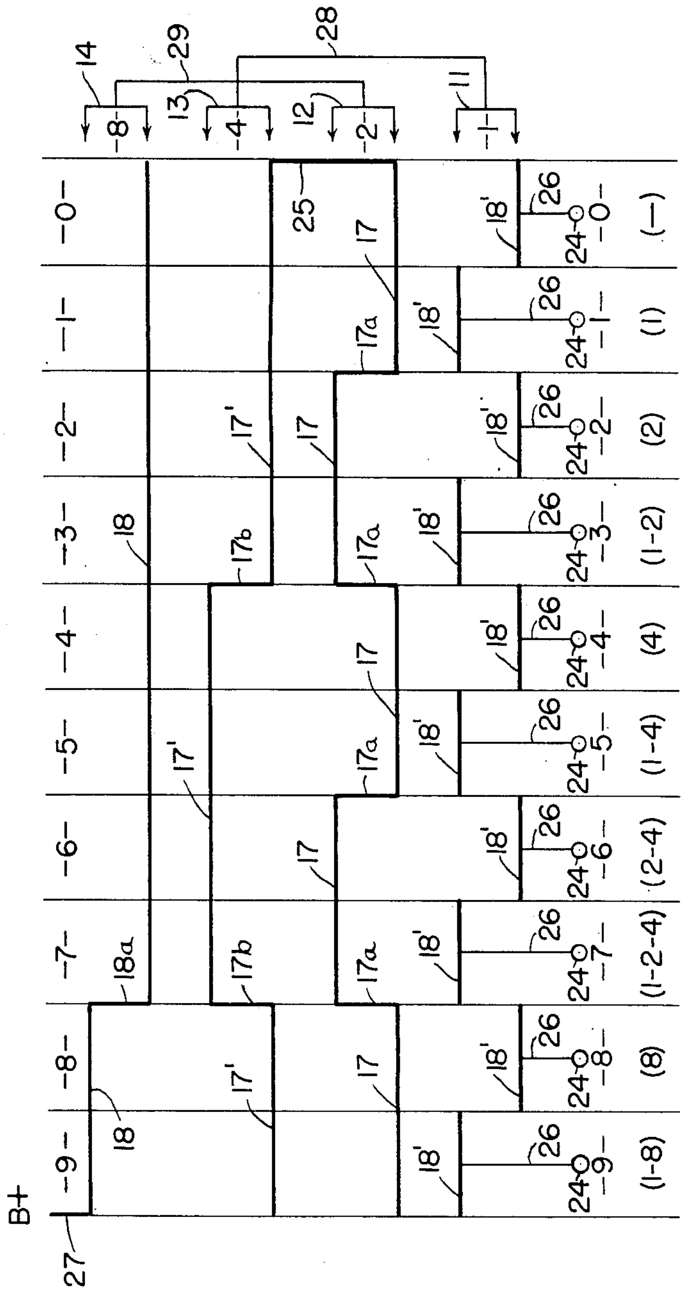
Figure 6 is a schematic view of another embodiment of my invention.

The reason for all this will be apparent from a study of Fig. 6 which may be viewed as a planar counterpart of the rotary arrangement previously described. At the same time it will be clearer from Fig. 6 how the underlying principle of interrelationships of the contacts and brushes can be worked into other geometrical arrangements such as cylindrical.

Referring to Fig. 6, it will be recalled that in the rotary embodiment described above there are eight separate rows of contacts, taking into account the fact that each of the sets of series of contacts 17, 17', 18 and 18' in the shape of sectors of rings is in effect two rows of contacts, one on the set-up side and one on the normal side of the stator. This is essentially what is shown in Fig. 6 wherein the contacts have been longitudinally displaced so that the respective contacts contacted by the brushes at any one instant of time are in vertical alignment rather than following one another as is necessary with the rotary embodiment previously described. For this reason the identifying numerals used in Figs. 1–4 have been used to indicate the corresponding parts in Fig. 6.

The four pairs of contact rows 17, 17', 18 and 18', each representing a binary code number, namely, the bits -8-, -4-, -2- and -1- reading down the page, have a set-up (upper) level and a normal (lower) level. The device is divided perpendicularly to the contact rows into ten divisions each representing a decimal digit, as indicated. For each division the contact is only in the upper level if the decimal digit for that segment has the binary component (bit) for that contact row as a component; it is only in the lower level if that decimal digit does not have that bit for a component. All -2- and -4- contacts are conductively interconnected by conductors 17*a* and 17*b*, respectively, and all -8- contacts are also interconnected by conductors 18*a*. The brushes 14, 13, 12 and 11 each representing the indicated bit are arranged to sweep along the paths of the contacts and to be selectively engageable with either the upper or lower level paths by any suitable means. The -8- and -2- brushes are conductively interconnected by conductor 29 and the -4- and -1- brushes are conductively interconnected by conductor 28.

The contacts on the set-up side are in the upper positions. Those on the normal side are in the lower positions.

The functioning will be apparent if one takes any piece of paper and places it to the right of Fig. 6, selects a particular bit combination, and indicates the brushes for each arm as in the corresponding upper or lower levels by means of four marks on the edge of the piece of paper; then if this piece of marked paper is slid laterally to the left over Fig. 6 it will be seen that in only one division are the contacts simultaneously contacted by all four brushes, and that is the division having a decimal number corresponding to the selected bits. The reason is that the circuit from B+ to any hub 24 must go through all four brushes and all four contact rows and that can only happen if the contacts for the bits forming the corresponding decimal are in the upper level at which the respective brushes have been set. Otherwise, the circuit is broken by failure of a brush to engage a contact. A perusal of the above chart of decimal-binary equivalents will show why there can be only one circuit closing combination per division.

Although I have described two embodiments of my invention it should be understood that other combinations and spacial relationships of the various elements of my invention may well be utilized to obtain the desired objective. By describing my invention as above I do not intend to limit my disclosure to this description it being understood that the contacts might well be spaced in linear rows these rows extending in one plane or around the periphery of a drum with the brushes traversing these rows in timed relation to the input pulses. It should be further realized that any means of selectively positioning the brushes in accordance with the input pulses "instructions" may be utilized and further realized that the above mechanism might use eight brushes rather than four thus eliminating the apertures in the stators and having instead a means of pulling four of the eight brushes on varying sides of the stator out of contact for each revolution depending on the input pulses "instructions." It is also possible in one embodiment of my invention to have a correspondingly greater number of rows of contacts all on one side of a stator and having various brushes bridging certain contacts at definite times.

It should be still further recognized that, although the above disclosure describes primarily a converter that converts a binary code input to a decimal output that a man skilled in the art can increase or decrease the number of elements and combinations of elements so described to create further embodiments that will convert a binary code to an alphabetical or other indicative output.

Having thus described my invention, I claim:

1. Apparatus for converting code to corresponding indicia, a device having divisions representing indicia, a contact for each bit within each division, said contact being positioned at a setup position if its bit is a component of the indicium for that division but at a normal position if not such a component, said divisions being constituted by respective sections of a planar supporting member, the setup position being one side of the member, the normal position being the other side thereof selected of said bit contacts being conductively interconnected, a brush for each bit arranged selectively to engage the normal or the setup position contacts of the corresponding bit, selected pairs of brushes being conductively interconnected and means for selectively transferring each brush from one side of said supporting member to the other side thereof to engage with setup position contacts for bits which are components of a selected indicium and with the normal position contacts for bits which are not such components; whereby a circuit is completed between all of the selected bit contacts only when all brushes are in that division the corresponding indicium of which is formed of the bits of the brushes in the setup position.

2. Apparatus for converting code to corresponding indicia, a device having divisions representing indicia, a contact for each bit within each division, said contact being positioned at a setup position if its bit is a component of the indicium for that division but at a normal position if not such a component, the normal and setup position being paths along which the brush below may be swept, selected of said bit contacts being conductively interconnected, a brush for each bit arranged selectively to sweep along the paths of the normal or the setup position contacts of the corresponding bit, selected pairs of brushes being conductively interconnected and means for selectably placing each brush on the path of the setup position contacts for bits which are components of a selected indicium and on the path of the normal position contacts for bits which are not such components, said divisions being disc sectors, the setup position being one side of the disc and the normal position the other, the brushes being selectively transferable from one side of the disc to the other in response to the presence or absence of a bit; whereby a circuit is completed between all of the selected bit contacts only when all brushes are in that division the corresponding indicium of which is formed of the bits of the brushes in the setup position.

3. Apparatus for converting binary code to decimal indicia, a device having divisions representing decimal indicia, a contact for each bit within each division, said contact being positioned at a setup position if its bit is a component of the decimal for that division but at a normal position if not such a component, all -2- and -4- bit contacts being conductively interconnected and all -8- bit contacts being conductively interconnected, a brush for each bit arranged selectively to engage the normal or the setup position contacts of the corresponding bit, the brushes for the -1- and -4- bits being conductively interconnected and those for the -2- and -8- bits being conductively interconnected, and means for selectively engaging each brush with setup position contact for bits which are components of a selected decimal unit and with the normal position contacts for bits which are not such components, said divisions being disc sectors, the setup position being one side of the disc and the normal position the other, the brushes being selectively transferable from one side of the disc to the other in response to the presence or absence of a bit whereby a circuit is completed between the -8- contacts and a -1- contact only when all brushes are in that division the decimal of which is formed of the bits of the brushes in the setup position.

4. Apparatus for converting binary code to decimal indicia, a device having divisions representing decimal indicia, a contact for each bit within each division, said contact being positioned at a setup position if its bit is a component of the decimal for that division but at a normal position if not such a component, the normal and setup positions being paths along which the brush below may be swept, all -2- and -4- bit contacts being conductively interconnected and all -8- bit contacts being conductively interconnected, a brush for each bit arranged selectively to sweep along the paths of the normal or the setup position contacts of the corresponding bit, the brushes for the -1- and -4- bits being conductively interconnected and those for the -2- and -8- bits being conductively interconnected, and means for selectively placing each brush on the path of the setup position contacts for bits which are components of a selected decimal unit and on the path of the normal position contacts for bits which are not such components, said divisions being disc sectors, the setup position being one side of the disc and the normal position the other, the brushes being selectively transferable from one side of the disc to the other in response to the presence or absence of a bit whereby a circuit is completed between the -8- contacts and a -1- contact only when all brushes are in that division the decimal of which is formed of the bits of the brushes in the setup position.

5. A device for converting code input pulses into a decimal output pulse comprising a plurality of rotary contacts, a common rotary shaft therefor, a stator for each of said contacts having a normal and a setup side, two series of contacts in concentric arcs on each stator, said stator contacts being disposed in spaced relation to one another on each of said sides, each of said rotary contacts being provided with a pair of flexible radial extending reed brushes, one of said brushes adapted to contact the outer series of stator contacts and the other brush adapted to contact the inner series of stator contacts, an aperture in each stator adapted to permit the passage of said brushes from one side to the other, a means disposed opposite each of said apertures to position the said brushes on one or the other of the sides of said stator, said means being controlled by the said binary code input pulses, means of rotating said shaft in timed relation with the said code input pulses, a source of potential, a means of electrically interconnecting the said source and a single outer series of stator contacts, means of electrically interconnecting the said stators to each other, and a readout means connected electrically to another outer series of stator contacts.

6. A device as in claim 5 in which the brushes are magnetic, and the means for positioning said brushes are magnets on opposite sides of the rotor.

7. A device as in claim 5 in which the means of electrically interconnecting the source of potential, the stators and the readout means comprises one or more of said stators having the stator contacts within each of said separate series of contacts interconnected, one of said stators having the stator contacts of said inner series of contacts interconnected, and having the contacts of said outer series of contacts electrically isolated, an electrical outlet connected to each of said last named contacts by means of a conductor, said source of potential being connected to the outer series of contacts of one of said stators having the contacts within each of said separate series of contacts interconnected, and a conductor interconnecting the inner series of contacts of all of said stators.

8. A device for converting code input pulses into a corresponding output pulse comprising a series of rotary contacts, each of said rotary contacts comprising a rotor attached to a common drive means, a plurality of interconnected brushes attached to said rotor, a stator for each of said contacts, a plurality of spaced electrical contacts positioned on both the normal and the setup sides of said stator, an aperture in said stator adapted to permit the passage of said brushes, an electromagnet disposed adjacent to said aperture on the setup side of said stator, a permanent magnet disposed adjacent to said aperture on the normal side of said stator, means for energizing said electromagnet by said input pulses, said common drive means acting in timed relation to said input pulses, a source of potential, a means of electrically connecting said source to the said stators and a means of electrically interconnecting said stators through said brushes.

9. A device for converting code input pulses into a pre-indicated output pulse comprising a series of rotary contacts, each of said rotary contacts comprising a rotor, a plurality of brushes attached to said rotor, a stator for each of said contacts, a plurality of spaced electrical contacts positioned on each side of said stator, a means of individually positioning said brushes on one of said sides during each rotation of said rotor, said means being controlled by said input pulses, a common means for driving each rotor of said rotary contacts in timed relation to the said input pulses, a source of potential, and a means of interconnecting said source with selected stator contacts through said brushes to produce an output pulse during each of said rotations.

10. In a switching device, the combination comprising a fixed contact element including a planar supporting member having a normal side and a setup side and a plurality of fixed contacts disposed in spaced relation on either side of said member, a movable contact element including a rotary brush adapted selectively to operate on either side of said member successively to engage the contacts thereon, said member having an opening therein to provide a passage for said brush from one side thereof to the other, and selective actuating means adjacent said opening for transferring said brush through said opening from one side of said member to the other.

11. In a switching device for converting code pulses to output pulses, the combination comprising a fixed contact element including an insulating disc having a normal side and a setup side and a plurality of fixed contacts disposed in a circular path on either side of said disc, a movable contact element including a rotary brush adapted selectively to operate on either side of said disc successively to engage the contacts thereon, said disc having an opening therein providing a passage for said brush from one side thereof to the other, and magnetic actuating means adjacent said opening and responsive to said code pulses for transferring said brush through said opening from one side of said member to the other.

References Cited in the file of this patent

UNITED STATES PATENTS

| | | |
|---|---|---|
| 1,880,409 | Bryce | Oct. 4, 1932 |
| 1,916,987 | Peirce | July 4, 1933 |
| 1,987,322 | Campbell | Jan. 8, 1935 |